(12) United States Patent
Yasui

(10) Patent No.: US 11,729,327 B2
(45) Date of Patent: Aug. 15, 2023

(54) SHEET CONVEYING DEVICE CAPABLE OF SWITCHING CONVEYANCE ROUTE OF SHEET, IMAGE PROCESSING APPARATUS, AND SHEET CONVEYING METHOD

(71) Applicant: KYOCERA Document Solutions Inc., Osaka (JP)

(72) Inventor: Yoshiaki Yasui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/654,799

(22) Filed: Mar. 14, 2022

(65) Prior Publication Data

US 2022/0303414 A1    Sep. 22, 2022

(30) Foreign Application Priority Data

Mar. 18, 2021   (JP) .................................. 2021-044944

(51) Int. Cl.
*H04N 1/04*  (2006.01)
*H04N 1/00*  (2006.01)

(52) U.S. Cl.
CPC ..... *H04N 1/00612* (2013.01); *H04N 1/00615* (2013.01); *H04N 1/00633* (2013.01); *H04N 1/00663* (2013.01); *H04N 1/00687* (2013.01); *H04N 1/00702* (2013.01); *H04N 1/00716* (2013.01); *H04N 1/00771* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2011/0069359 A1* | 3/2011 | Tojo | .................... | H04N 1/00572 |
| | | | | 358/498 |
| 2014/0211277 A1* | 7/2014 | Ozaki | .................. | H04N 1/1008 |
| | | | | 358/496 |
| 2021/0099593 A1* | 4/2021 | Nakagawa | ......... | H04N 1/00615 |
| 2021/0101769 A1* | 4/2021 | Kawasaki | .............. | B65H 31/24 |
| 2021/0234987 A1* | 7/2021 | Sadowara | .......... | H04N 1/00748 |

FOREIGN PATENT DOCUMENTS

JP            2018198359 A       12/2018

* cited by examiner

*Primary Examiner* — Dung D Tran
(74) *Attorney, Agent, or Firm* — Alleman Hall Creasman & Tuttle LLP

(57) ABSTRACT

A sheet conveying device includes a reception processing portion and a conveyance control portion. The reception processing portion receives an input operation to input conveyance route information that indicates which of a first conveyance route, leading to a first discharge portion via a first conveyance path that extends straight from a sheet placement portion, and a second conveyance route, leading to a second discharge portion, which is different from the first discharge portion, via a second conveyance path that includes a curved portion branching off from the first conveyance path, each sheet included in a sheet stack placed on the sheet placement portion is conveyed along. The conveyance control portion sequentially conveys each sheet included in the sheet stack placed on the sheet placement portion along either the first conveyance route or the second conveyance route according to the conveyance route information input through the input operation.

9 Claims, 7 Drawing Sheets

SHEET CONVEYING DEVICE CAPABLE OF SWITCHING CONVEYANCE ROUTE OF SHEET, IMAGE PROCESSING APPARATUS, AND SHEET CONVEYING METHOD

INCORPORATION BY REFERENCE

This application is based upon and claims the benefit of priority from the corresponding Japanese Patent Application No. 2021-044944 filed on Mar. 18, 2021, the entire contents of which are incorporated herein by reference.

BACKGROUND

The present disclosure relates to a sheet conveying device, an image processing apparatus including a sheet conveying device, and a sheet conveying method.

There is known an image processing apparatus provided with a sheet conveying device that conveys document sheets to be read. In addition, as a related art, there is known an image reading apparatus provided with a first conveyance path, extending straight from a sheet placement portion on which sheets to be conveyed are placed and leading to a first discharge portion from which the sheets are discharged, and a second conveyance path, including a curved portion that branches off from the first conveyance path and leading to a second discharge portion, which is different from the first discharge portion. In the image reading apparatus, the conveyance route of the sheets after a branching portion at which the second conveyance path branches off from the first conveyance path is switched on the basis of type information about the type of the sheets input by a user.

SUMMARY

A sheet conveying device according to an aspect of the present disclosure includes a reception processing portion and a conveyance control portion. The reception processing portion is configured to receive an input operation to input conveyance route information that indicates which of a first conveyance route and a second conveyance route each of sheets included in a sheet stack placed on a sheet placement portion is conveyed along. The first conveyance route leads to a first discharge portion via a first conveyance path that extends straight from the sheet placement portion. The second conveyance route leads to a second discharge portion, which is different from the first discharge portion, via a second conveyance path that includes a curved portion branching off from the first conveyance path. The conveyance control portion is configured to sequentially convey each of the sheets included in the sheet stack placed on the sheet placement portion along either the first conveyance route or the second conveyance route according to the conveyance route information input through the input operation.

An image processing apparatus according to another aspect of the present disclosure includes the sheet conveying device and an image reading portion. The image reading portion is configured to read images on the sheets conveyed by the sheet conveying device.

A sheet conveying method according to yet another aspect of the present disclosure includes a reception step and a conveyance control step. In the reception step, an input operation to input conveyance route information that indicates which of a first conveyance route and a second conveyance route each of sheets included in a sheet stack placed on a sheet placement portion is conveyed along is received. The first conveyance route leads to a first discharge portion via a first conveyance path that extends straight from the sheet placement portion. The second conveyance route leads to a second discharge portion, which is different from the first discharge portion, via a second conveyance path that includes a curved portion branching off from the first conveyance path. In the conveyance control step, each of the sheets included in the sheet stack placed on the sheet placement portion is sequentially conveyed along either the first conveyance route or the second conveyance route according to the conveyance route information input through the input operation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

[Configuration of Image Forming Apparatus 100]

First, the configuration of an image forming apparatus 100 according to an embodiment of the present disclosure will be described with reference to FIG. 1.

The image forming apparatus 100 is a multifunction peripheral with multiple functions such as a scan function of reading images from document sheets, a print function of forming images on the basis of image data, a facsimile function, and a copy function. The image forming apparatus 100 is an example of an image processing apparatus of the present disclosure. The image processing apparatus of the present disclosure may be a scanner, a facsimile apparatus, a copier, or the like.

Figure 1:
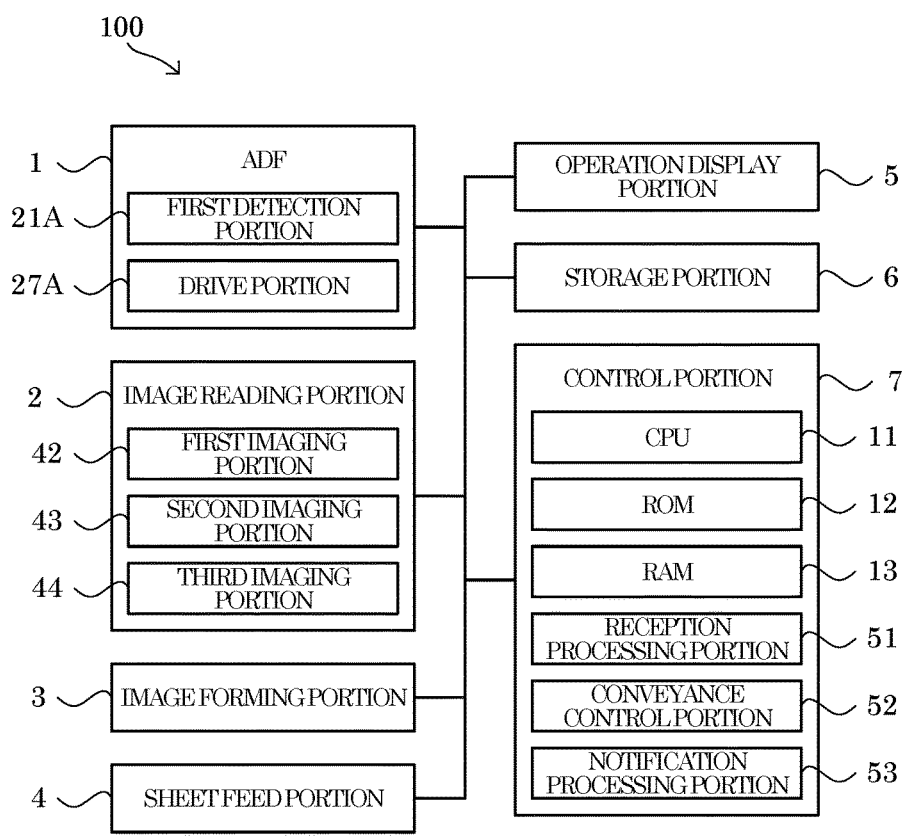
FIG. 1 is a block diagram showing a system configuration of an image forming apparatus according to an embodiment of the present disclosure.

As shown in FIG. 1, the image forming apparatus 100 includes an ADF (Automatic Document Feeder) 1, an image reading portion 2, an image forming portion 3, a sheet feed portion 4, an operation display portion 5, a storage portion 6, and a control portion 7.

The ADF 1 conveys document sheets (an example of a sheet of the present disclosure) to be read by the scan function.

The image reading portion 2 implements the scan function. Specifically, the image reading portion 2 reads images on the document sheets conveyed by the ADF 1. The image reading portion 2 also reads images on document sheets placed on a document sheet table 41 (see FIG. 2).

The image forming portion 3 implements the print function. For example, the image forming portion 3 forms images on sheets supplied by the sheet feed portion 4 by electrophotographic method. For example, the image forming portion 3 includes a photoconductor drum, a charging roller, a laser scanning unit, a developing device, a transfer roller, a cleaning device, a fixing device, and an output tray.

The sheet feed portion 4 supplies the sheets to the image forming portion 3. For example, the sheet feed portion 4 includes a sheet feed cassette, a manual feed tray, a sheet conveyance path, and a plurality of conveying rollers.

The operation display portion 5 is a user interface of the image forming apparatus 100. For example, the operation display portion 5 includes a display portion and an operation portion. The display portion includes a liquid crystal display and displays various types of information according to control instructions from the control portion 7. The operation portion includes operation keys and a touch panel for inputting various types of information to the control portion 7 according to user operations.

The storage portion 6 is a nonvolatile storage device. For example, the storage portion 6 may be a nonvolatile memory such as a flash memory and EEPROM or a storage device such as an SSD (Solid State Drive) and an HDD (Hard Disk Drive).

The control portion 7 provides integrated control over the image forming apparatus 100. As shown in FIG. 1, the control portion 7 includes a CPU 11, a ROM 12, and a RAM 13. The CPU 11 is a processor that executes various types of arithmetic processes. The ROM 12 is a nonvolatile storage device storing in advance information including control programs to cause the CPU 11 to execute various types of processes. The RAM 13 is a volatile or nonvolatile storage device used as a temporary memory (work area) for the various types of processes executed by the CPU 11. In the control portion 7, the CPU 11 executes the various types of control programs stored in the ROM 12 in advance. Thus, the control portion 7 provides integrated control over the image forming apparatus 100.

[Configurations of ADF 1 and Image Reading Portion 2]

Next, the configurations of the ADF 1 and the image reading portion 2 will be described with reference to FIGS. 1 and 2. Here, FIG. 2 is a cross-sectional view showing the configurations of the ADF 1 and the image reading portion 2.

Figure 2:
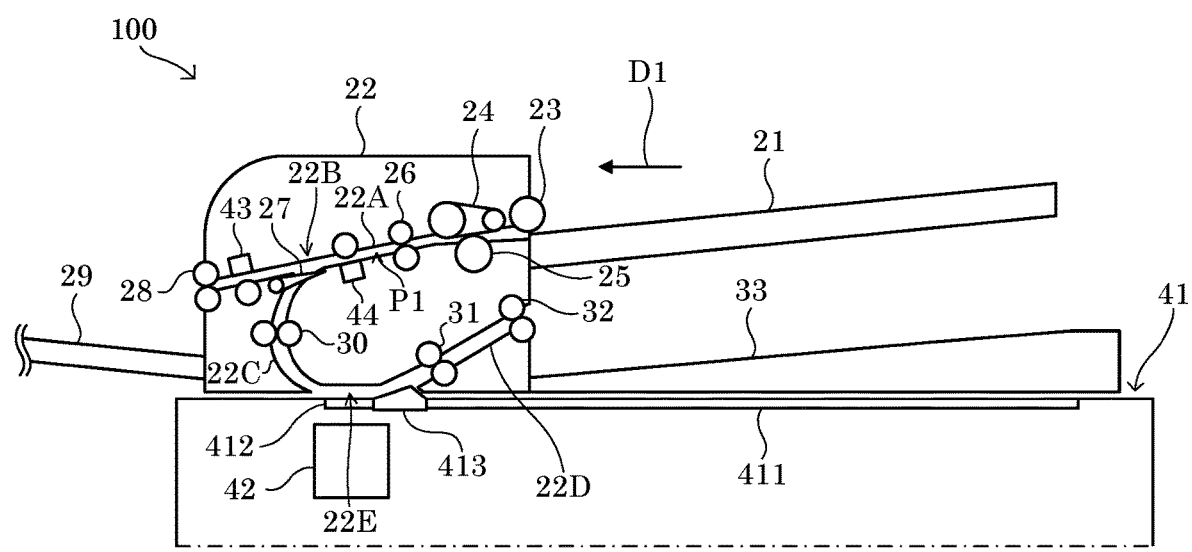
FIG. 2 shows configurations of an ADF and an image reading portion of the image forming apparatus according to the embodiment of the present disclosure.

As shown in FIG. 2, the ADF 1 includes a document sheet placement portion 21, a housing 22, a pickup roller 23, a sheet feed belt 24, a separation roller 25, a registration roller 26, a switching portion 27, a first discharge roller 28, a first discharge portion 29, a first conveying roller 30, a second conveying roller 31, a second discharge roller 32, and a second discharge portion 33.

The document sheets to be conveyed are placed on the document sheet placement portion 21. In the ADF 1, the document sheets placed on the document sheet placement portion 21 are conveyed in a conveying direction D1 shown in FIG. 2. The document sheet placement portion 21 is an example of a sheet placement portion of the present disclosure.

The document sheet placement portion 21 is provided with a first detection portion 21A shown in FIG. 1. The first detection portion 21A detects the presence or absence of document sheets placed on the document sheet placement portion 21. For example, the first detection portion 21A is a reflective optical sensor provided for the document sheet mounting surface in the document sheet placement portion 21.

The document sheet placement portion 21 is further provided with a lift plate (not shown). The lift plate lifts a document sheet stack placed on the document sheet placement portion 21 to a contact position with the pickup roller 23.

The housing 22 houses rollers and the like used to convey the document sheets. As shown in FIG. 2, a first conveyance path 22A and a second conveyance path 22D that guide the document sheets are formed inside the housing 22. The first conveyance path 22A extends straight from the document sheet placement portion 21 to the first discharge portion 29. The second conveyance path 22D includes a curved portion 22C (see FIG. 2) branching off from the first conveyance path 22A at a branching portion 22B (see FIG. 2) and leads to the second discharge portion 33. The curved portion 22C is curved with a curvature that allows the document sheets to make U-turns inside the housing 22.

In the ADF 1, the document sheets placed on the document sheet placement portion 21 are conveyed along either a first conveyance route leading to the first discharge portion 29 via the first conveyance path 22A or a second conveyance route leading to the second discharge portion 33 via the second conveyance path 22D.

As shown in FIG. 2, the housing 22 has an opening 22E at its bottom. Part of the second conveyance path 22D is exposed to the outside through the opening 22E. At the opening 22E, the image reading portion 2 reads images on the document sheets conveyed by the ADF 1 using a first imaging portion 42 (see FIGS. 1 and 2).

The pickup roller 23 is disposed above the document sheet placement portion 21. The pickup roller 23 comes into contact with the surface (upper surface) of the uppermost document sheet in the document sheet stack lifted by the lift plate to convey the document sheet in the conveying direction D1.

The sheet feed belt 24 is disposed on the first conveyance path 22A. The sheet feed belt 24 comes into contact with the document sheet conveyed by the pickup roller 23 in the conveying direction D1 to convey the document sheet downstream in the conveying direction D1.

The separation roller 25 is disposed under the sheet feed belt 24 and is in contact with the sheet feed belt 24. The separation roller 25 separates the document sheet that is in contact with the sheet feed belt 24 from a plurality of document sheets located under the document sheet and conveyed to a contact position with the sheet feed belt 24.

The registration roller 26 is disposed on the first conveyance path 22A downstream of the sheet feed belt 24 in the conveying direction D1. The registration roller 26 comes into contact with the document sheet conveyed by the sheet feed belt 24 to convey the document sheet downstream in the conveying direction D1.

The switching portion 27 is disposed at the branching portion 22B on the first conveyance path 22A downstream of the registration roller 26 in the conveying direction D1. The switching portion 27 is a guide member that comes into contact with the document sheet conveyed by the registration roller 26 to guide the document sheet either to a part of the first conveyance path 22A downstream of the branching portion 22B or to the second conveyance path 22D. Specifically, the switching portion 27 is switchable between a first position for guiding the document sheet to the part of the first conveyance path 22A downstream of the branching portion 22B and a second position for guiding the document sheet to the second conveyance path 22D. The switching portion 27 changes its position upon receiving a driving force supplied by a drive portion 27A shown in FIG. 1. For example, the drive portion 27A is a motor.

The first discharge roller 28 is disposed on the first conveyance path 22A downstream of the branching portion 22B in the conveying direction D1. The first discharge roller 28 comes into contact with the document sheet guided downstream of the branching portion 22B along the first conveyance path 22A by the switching portion 27 to discharge the document sheet to the first discharge portion 29. The document sheet discharged by the first discharge roller 28 is stacked on the first discharge portion 29.

The first conveying roller 30 is disposed at the curved portion 22C on the second conveyance path 22D. The first conveying roller 30 comes into contact with the document sheet conveyed by the switching portion 27 to the second conveyance path 22D to convey the document sheet downstream in the conveying direction D1.

The opening 22E is formed in the second conveyance path 22D downstream of the first conveying roller 30 in the conveying direction D1. At the opening 22E, the image reading portion 2 reads the image on the document sheet passing through the opening 22E using the first imaging portion 42 (see FIGS. 1 and 2).

The second conveying roller 31 is disposed on the second conveyance path 22D downstream of the opening 22E in the conveying direction D1. The second conveying roller 31 comes into contact with the document sheet conveyed by the first conveying roller 30 to convey the document sheet downstream in the conveying direction D1.

The second discharge roller 32 is disposed on the second conveyance path 22D downstream of the second conveying roller 31 in the conveying direction D1. The second discharge roller 32 comes into contact with the document sheet conveyed by the second conveying roller 31 to discharge the document sheet to the second discharge portion 33. The document sheet discharged by the second discharge roller 32 is stacked on the second discharge portion 33.

As shown in FIGS. 1 and 2, the image reading portion 2 includes the document sheet table 41, the first imaging portion 42, a second imaging portion 43, and a third imaging portion 44.

A document sheet to be read can be placed on the document sheet table 41. The document sheet table 41 is located in an upper portion of the housing of the image forming apparatus 100. The ADF 1 can be opened and closed so that the ADF 1 is separated from and placed on the document sheet table 41, and also serves as a document sheet cover that supports one side of a document sheet placed on a first contact glass 411 of the document sheet table 41.

As shown in FIG. 2, the document sheet table 41 includes the first contact glass 411, a second contact glass 412, and a guide member 413. A document sheet with an image to be read by the first imaging portion 42 can be placed on the first contact glass 411. The second contact glass 412 and the guide member 413 face the opening 22E in the housing 22 and form a part of the second conveyance path 22D when the ADF 1 is closed and placed on the document sheet table 41. The second contact glass 412 allows a light beam emitted from the first imaging portion 42 to the opening 22E and a light beam reflected from a document sheet to pass therethrough. The guide member 413 is located downstream of the second contact glass 412 in the conveying direction D1 and guides the document sheet to the second conveying roller 31.

The first imaging portion 42 is disposed below the first contact glass 411 and the second contact glass 412. The first imaging portion 42 extends to the back of the page in FIG. 2 and is movable to the left and right of the page in FIG. 2. The first imaging portion 42 reads the image on the front side of the document sheet conveyed by the ADF 1 while being disposed below the second contact glass 412. Specifically, the first imaging portion 42 includes a CIS (Contact Image Sensor) and a housing that houses the CIS. The first imaging portion 42 outputs an analog signal corresponding to the image read from the front side of the document sheet. The analog signal output from the first imaging portion 42 is converted into a digital signal (image data) by an analog front end circuit (not shown) and input to the control portion 7.

The second imaging portion 43 is disposed on the first conveyance path 22A downstream of the branching portion 22B in the conveying direction D1 and upstream of the first discharge roller 28 in the conveying direction D1. The second imaging portion 43 reads the image on the front side of the document sheet guided downstream of the branching portion 22B along the first conveyance path 22A by the switching portion 27. Specifically, the second imaging portion 43 is a CIS. The second imaging portion 43 outputs an analog signal corresponding to the image read from the front side of the document sheet. The analog signal output from the second imaging portion 43 is converted into a digital signal (image data) by the analog front end circuit and input to the control portion 7.

The third imaging portion 44 is disposed on the first conveyance path 22A upstream of the branching portion 22B in the conveying direction D1 and downstream of the registration roller 26 in the conveying direction D1. The third imaging portion 44 reads the image on the back side of the document sheet conveyed by the registration roller 26. Specifically, the third imaging portion 44 is a CIS. The third imaging portion 44 outputs an analog signal corresponding to the image read from the back side of the document sheet. The analog signal output from the third imaging portion 44 is converted into a digital signal (image data) by the analog front end circuit and input to the control portion 7.

In a known image reading apparatus, the conveyance route of the document sheet after the branching portion 22B on the first conveyance path 22A can be switched on the basis of type information about the type of the document sheet input by a user.

However, in a case where a document sheet stack is to be conveyed, such an image reading apparatus can accept only one piece of type information corresponding to the document sheet stack; that is, the type information cannot be input for each document sheet included in the document sheet stack. Accordingly, in a case where the document sheet stack to be conveyed includes multiple types of document sheets, the conveyance route cannot be switched for each document sheet included in the document sheet stack on the basis of the information input by the user.

In contrast, in the image forming apparatus 100 according to the embodiment of the present disclosure, the conveyance route can be switched for each document sheet included in the document sheet stack to be conveyed on the basis of the information input by the user.

[Configuration of Control Portion 7]

Next, the configuration of the control portion 7 will be described in more detail with reference to FIG. 1.

As shown in FIG. 1, the control portion 7 includes a reception processing portion 51, a conveyance control portion 52, and a notification processing portion 53.

Figure 5:
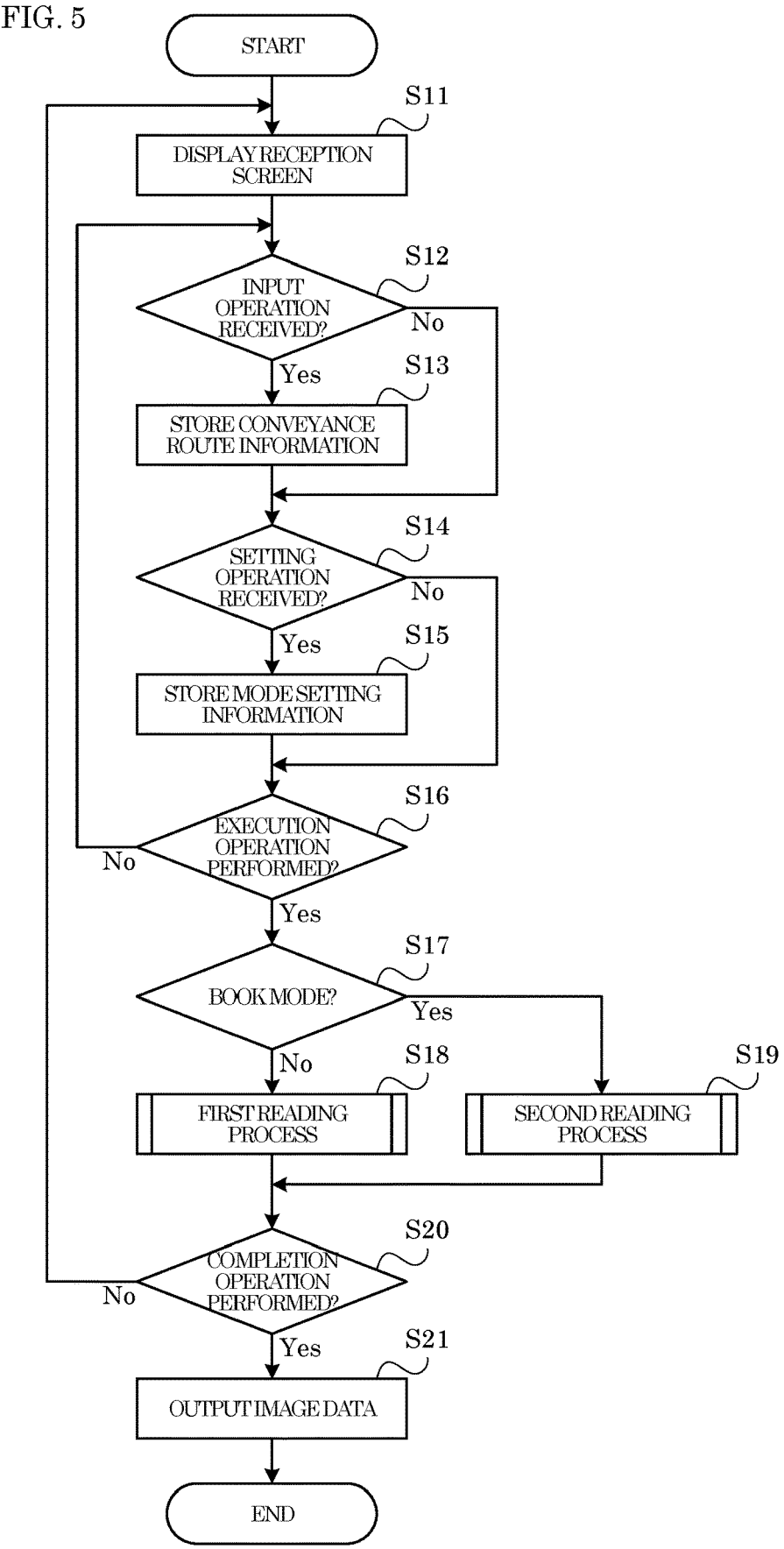
FIG. 5 is a flowchart showing an example of a document sheet reading process executed by the image forming apparatus according to the embodiment of the present disclosure.

Specifically, the ROM 12 stores in advance a document sheet reading program to cause the CPU 11 to execute a document sheet reading process (described later; see FIG. 5). The control portion 7 executes the document sheet reading program stored in the ROM 12 and thereby functions as the reception processing portion 51, the conveyance control portion 52, and the notification processing portion 53. Here, a device including the ADF 1 and the control portion 7 is an example of a sheet conveying device of the present disclosure.

It is noted that the document sheet reading program may be recorded in a computer-readable recording medium such as a CD, a DVD, and a flash memory, and may be read from the recording medium to be stored in a storage device such as the storage portion 6. In addition, the reception processing portion 51, the conveyance control portion 52, and the notification processing portion 53 may be composed of an electronic circuit such as an integrated circuit (ASIC).

The reception processing portion 51 receives an input operation to input conveyance route information that indicates which of the first conveyance route and the second conveyance route each document sheet included in the document sheet stack (an example of a sheet stack of the present disclosure) placed on the document sheet placement portion 21 is conveyed along.

For example, the conveyance route information indicates the ordinal positions of the document sheets to be conveyed along the first conveyance route.

The reception processing portion 51 also receives a predetermined specific operation in addition to the input operation.

Figure 3:
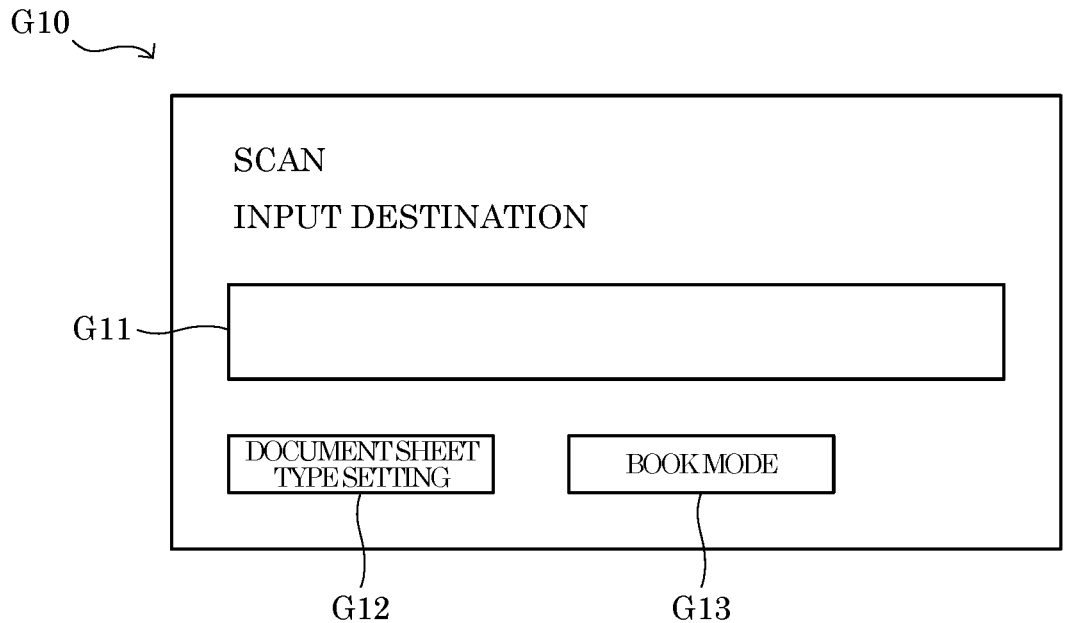
FIG. 3 shows an example of a reception screen displayed in the image forming apparatus according to the embodiment of the present disclosure.

For example, the reception processing portion 51 causes the operation display portion 5 to display a reception screen G10 shown in FIG. 3 in response to a predetermined call operation performed on the operation display portion 5.

As shown in FIG. 3, the reception screen G10 includes messages to the user, a destination input section G11, a document sheet type setting key G12, and a book mode key G13.

The destination input section G11 receives an input of destination information that indicates the destination to which data about the document sheets read by the scan function is output.

Figure 4:
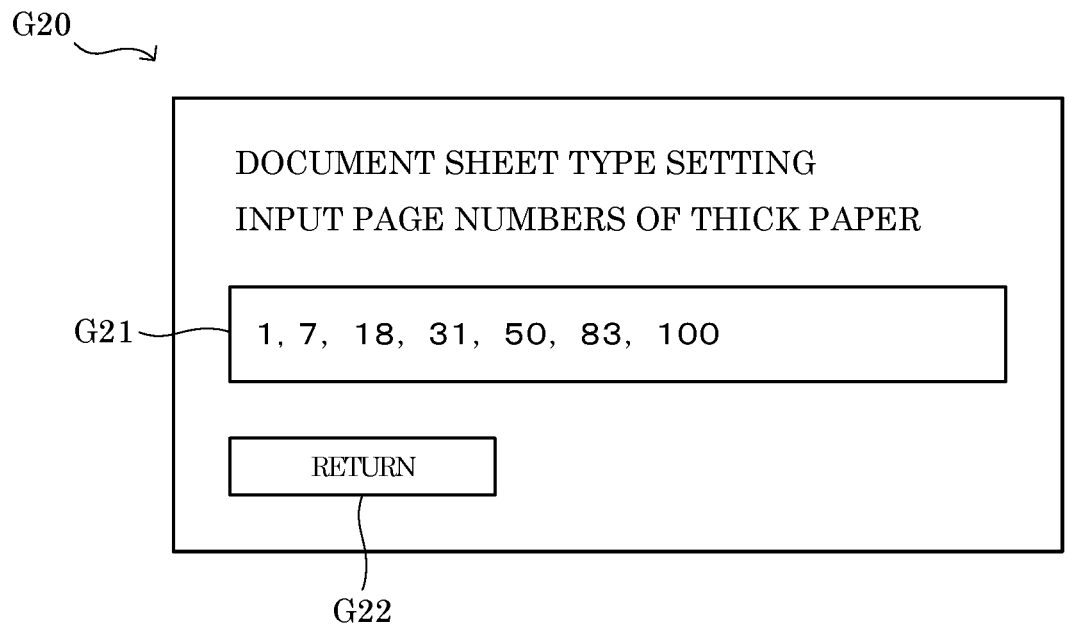
FIG. 4 shows an example of a document sheet type setting screen displayed in the image forming apparatus according to the embodiment of the present disclosure.

The document sheet type setting key G12 is an operation key for receiving a display operation that causes a document sheet type setting screen G20 shown in FIG. 4 to be displayed.

Here, the document sheet type setting screen G20 is a screen used to set the type of each document sheet included in the document sheet stack placed on the document sheet placement portion 21. In the image forming apparatus 100, the type of each document sheet included in the document sheet stack placed on the document sheet placement portion 21 can be set to either "normal paper" or "thick paper". The document sheets set to "normal paper" are conveyed along the second conveyance route, whereas the document sheets set to "thick paper" are conveyed along the first conveyance route. The user can set in advance the type of each document sheet included in the document sheet stack placed on the document sheet placement portion 21 to prevent malfunctions such as jams caused by, for example, thick or sturdy document sheets conveyed along the second conveyance route.

The reception processing portion 51 causes the operation display portion 5 to display the document sheet type setting screen G20 in response to an operation on the document sheet type setting key G12.

As shown in FIG. 4, the document sheet type setting screen G20 includes messages to the user, a page number input section G21, and a return key G22.

In the document sheets included in the document sheet stack placed on the document sheet placement portion 21, the page numbers of the document sheets to be set to "thick paper" are input in the page number input section G21. Here, the page numbers indicate the ordinal positions of the document sheets to be set to "thick paper" in the document sheet stack placed on the document sheet placement portion 21. In the image forming apparatus 100, the type of each document sheet included in the document sheet stack placed on the document sheet placement portion 21 is set by inputting the page numbers of the document sheets to be set to "thick paper" as shown in the messages on the document sheet type setting screen G20. As described above, the document sheets set to "thick paper" are conveyed along the first conveyance route. That is, the page numbers input in the page number input section G21 correspond to the conveyance route information.

The return key G22 is an operation key for receiving the input operation.

The reception processing portion 51 stores the page numbers input in the page number input section G21, that is, the conveyance route information in a predetermined first storage area of the storage portion 6 in response to the operation on the return key G22.

The book mode key G13 is an operation key for receiving a setting operation to set a mode of reading the document sheets to a book mode. In the book mode, the uppermost and lower most document sheets included in the document sheet stack to be conveyed are treated as "thick paper", and the other document sheets are treated as "normal paper". The setting operation is an example of the specific operation.

The reception processing portion 51 stores mode setting information indicating that the mode of reading the document sheets is set to the book mode in a second storage area, which is different from the first storage area, of the storage portion 6 in response to the operation on the book mode key G13.

It is noted that the reception processing portion 51 may not necessarily need to receive the specific operation. In addition, the conveyance route information may indicate the ordinal positions of the document sheets to be conveyed along the second conveyance route.

In a case where the specific operation is not received, the conveyance control portion 52 sequentially conveys each of the document sheets included in the document sheet stack placed on the document sheet placement portion 21 along either the first conveyance route or the second conveyance route according to the conveyance route information input through the input operation.

In a case where the specific operation is received, the conveyance control portion 52 conveys the first document sheet in the document sheet stack placed on the document sheet placement portion 21 along the first conveyance route, sequentially conveys the subsequent document sheets along the second conveyance route until it is determined that the last document sheet in the document sheet stack has been conveyed from the document sheet placement portion 21 on the basis of the result of detection by the first detection portion 21A, and then conveys the last document sheet along the first conveyance route. The conveyance control portion 52 may determine that the last document sheet in the document sheet stack has been conveyed from the document sheet placement portion 21 when a detection signal output from the first detection portion 21A is switched from a first signal that indicates the presence of the document sheet to a second signal that indicates the absence of the document sheet due to the conveyance of the document sheets from the document sheet placement portion 21 by the pickup roller 23 and the sheet feed belt 24.

In a case where the number of document sheets conveyed by the conveyance control portion 52 by the time it is determined that the last document sheet in the document sheet stack placed on the document sheet placement portion 21 has been conveyed from the document sheet placement portion 21 on the basis of the result of detection by the first detection portion 21A is less than the numbers indicating the ordinal positions of the document sheets to be conveyed included in the conveyance route information, the notification processing portion 53 provides notification to that effect.

For example, the notification processing portion 53 causes the operation display portion 5 to display messages to the effect that the number of document sheets conveyed by the conveyance control portion 52 is less than the numbers indicating the ordinal positions of the document sheets to be conveyed included in the conveyance route information and that there is a possibility of a double feed.

It is noted that the control portion 7 may not necessarily need to include the notification processing portion 53.

[Document Sheet Reading Process]

A sheet conveying method of the present disclosure will now be described with reference to FIG. 5 using an example of a procedure of the document sheet reading process executed by the control portion 7 in the image forming apparatus 100. Here, steps S11, S12, . . . represent the numbers of processing procedures (steps) executed by the control portion 7. It is noted that the document sheet reading process is executed when the call operation is performed on the operation display portion 5.

<Step S11>

First, in step S11, the control portion 7 causes the operation display portion 5 to display the reception screen G10. Here, the process in step S11 is an example of a reception step of the present disclosure and is executed by the reception processing portion 51 of the control portion 7.

<Step S12>

In step S12, the control portion 7 determines whether the input operation is received.

Specifically, the control portion 7 determines that the input operation is received in a case where an operation is performed on the document sheet type setting key G12 on the reception screen G10 and where, on the document sheet type setting screen G20 displayed in response to the above-described operation, an operation is performed on the return key G22 with the page numbers input in the page number input section G21.

Upon determining that the input operation is received (Yes in step S12), the control portion 7 moves the process to step S13. In a case where the input operation is not received (No in step S12), the control portion 7 moves the process to step S14.

<Step S13>

In step S13, the control portion 7 stores the conveyance route information input by the input operation in the first storage area of the storage portion 6.

<Step S14>

In step S14, the control portion 7 determines whether the setting operation is received.

Specifically, the control portion 7 determines that the setting operation is received in a case where an operation is performed on the book mode key G13 on the reception screen G10.

Upon determining that the setting operation is received (Yes in step S14), the control portion 7 moves the process to step S15. In a case where the setting operation is not received (No in step S14), the control portion 7 moves the process to step S16.

<Step S15>

In step S15, the control portion 7 stores the mode setting information in the second storage area of the storage portion 6.

<Step S16>

In step S16, the control portion 7 determines whether an execution operation to execute a process of reading the images on the document sheets included in the document sheet stack placed on the document sheet placement portion 21 is performed.

For example, the control portion 7 determines that the execution operation is performed when a predetermined operation key in the operation display portion 5 is operated. It is noted that the reception screen G10 may include the operation key for receiving the execution operation.

Upon determining that the execution operation is performed (Yes in step S16), the control portion 7 moves the process to step S17. In a case where the execution operation is not performed (No in step S16), the control portion 7 moves the process to step S12.

<Step S17>

In step S17, the control portion 7 determines whether the mode of reading the document sheets is set to the book mode.

Specifically, the control portion 7 determines that the mode of reading the document sheets is set to the book mode in a case where the mode setting information is stored in the second storage area of the storage portion 6.

Upon determination that the mode of reading the document sheets is set to the book mode (Yes in step S17), the control portion 7 moves the process to step S19. In a case where the mode of reading the document sheets is not set to the book mode (No in step S17), the control portion 7 moves the process to step S18.

<Step S18>

In step S18, the control portion 7 executes a first reading process (described later). Here, the process in step S18 is an example of a conveyance control step of the present disclosure and is executed by the conveyance control portion 52 of the control portion 7.

In the first reading process, the image on each document sheet included in the document sheet stack placed on the document sheet placement portion 21 is read, and a plurality of pieces of image data corresponding to the plurality of document sheets included in the document sheet stack are stored in a predetermined third storage area of the storage portion 6.

<Step S19>

In step S19, the control portion 7 executes a second reading process (described later). Here, the process in step S19 is executed by the conveyance control portion 52 of the control portion 7.

In the second reading process, the image on each document sheet included in the document sheet stack placed on the document sheet placement portion 21 is read, and a plurality of pieces of image data corresponding to the plurality of document sheets included in the document sheet stack are stored in the third storage area of the storage portion 6.

<Step S20>

In step S20, the control portion 7 determines whether a completion operation to complete the document sheet reading process is performed.

For example, the control portion 7 causes the operation display portion 5 to display a selection screen for selecting continuation or completion of the document sheet reading process after the first reading process or the second reading process is completed. In a case where an operation to select the completion of the document sheet reading process is performed on the selection screen, the control portion 7 determines that the completion operation is performed.

Upon determining that the completion operation is performed (Yes in step S20), the control portion 7 moves the process to step S21. In a case where the completion operation is not performed (No in step S20), the control portion 7 moves the process to step S11. In this case, the user can place a new document sheet stack on the document sheet placement portion 21 so that the images on the document sheets included in the document sheet stack can be read.

It is noted that the process in step S20 may be omitted. In addition, the process in step S20 may be executed only in a case where the mode of reading the document sheets is set to a continuous reading mode in advance.

<Step S21>

In step S21, the control portion 7 outputs document sheet stack data, into which the plurality of pieces of image data corresponding to the plurality of document sheets stored in the third storage area of the storage portion 6 are integrated, to the destination input on the reception screen G10.

[First Reading Process]

Figure 6:
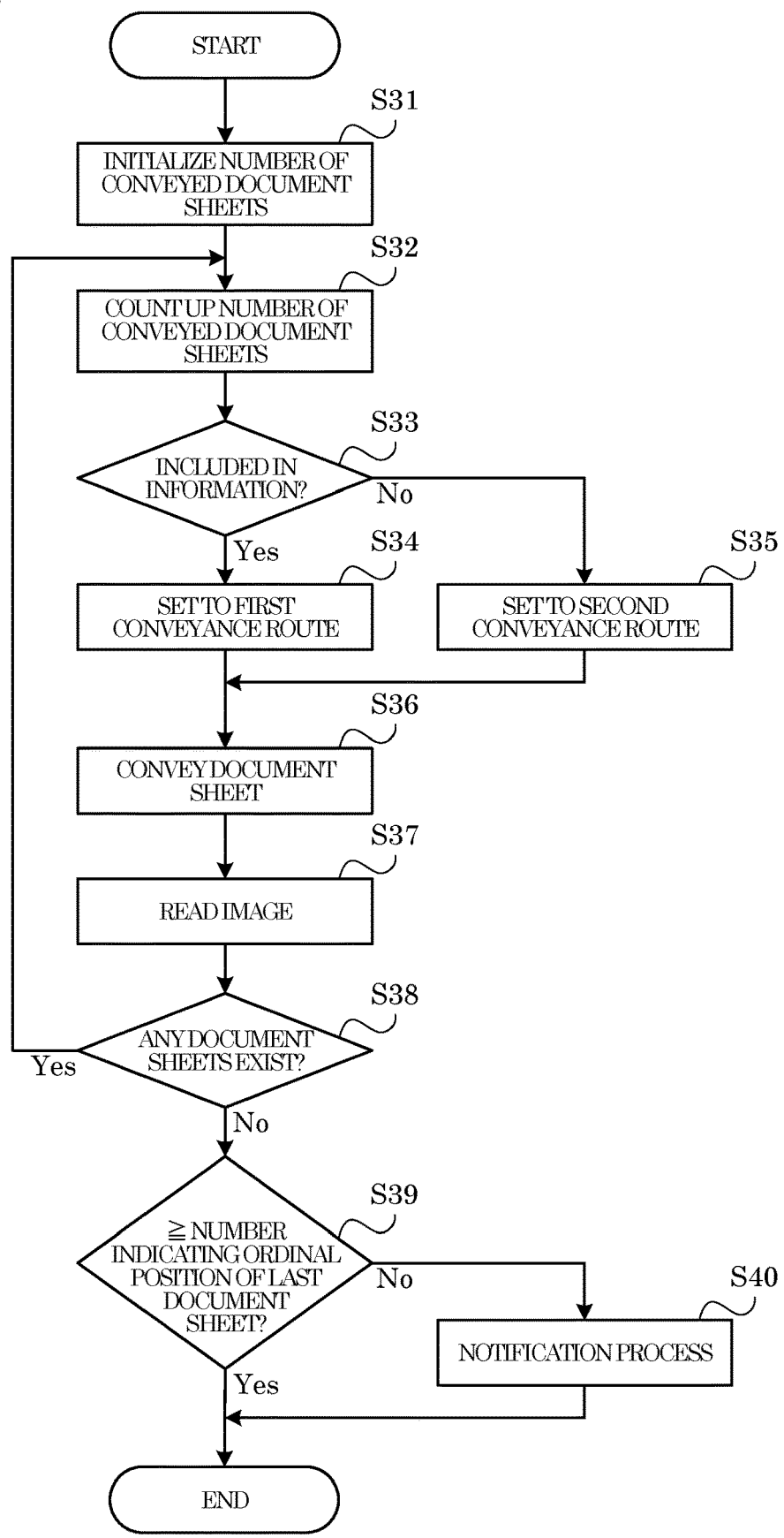
FIG. 6 is a flowchart showing an example of a first reading process executed by the image forming apparatus according to the embodiment of the present disclosure.

Next, the first reading process executed in step S18 of the document sheet reading process will be described with reference to FIG. 6.

<Step S31>

First, in step S31, the control portion 7 initializes the number of conveyed document sheets. That is, the control portion 7 sets the number of conveyed document sheets to zero.

<Step S32>

In step S32, the control portion 7 counts up the number of conveyed document sheets.

<Step S33>

In step S33, the control portion 7 determines whether the current number of conveyed document sheets is included in the conveyance route information stored in the first storage area of the storage portion 6.

Upon determining that the current number of conveyed document sheets is included in the conveyance route information (Yes in step S33), the control portion 7 moves the process to step S34. In a case where the current number of conveyed document sheets is not included in the conveyance route information (No in step S33), the control portion 7 moves the process to step S35.

<Step S34>

In step S34, the control portion 7 sets the conveyance route of the document sheets to the first conveyance route.

Specifically, the control portion 7 drives the drive portion 27A to set the switching portion 27 to the first position.

<Step S35>

In step S35, the control portion 7 sets the conveyance route of the document sheets to the second conveyance route.

Specifically, the control portion 7 drives the drive portion 27A to set the switching portion 27 to the second position.

<Step S36>

In step S36, the control portion 7 conveys one of the document sheets placed on the document sheet placement portion 21 along the conveyance route set in step S34 or S35.

Specifically, the control portion 7 drives a motor (not shown) to rotate the rollers inside the housing 22.

<Step S37>

In step S37, the control portion 7 reads the image on the document sheet conveyed by the process in step S36.

Specifically, in the case where the conveyance route is set to the first conveyance route, the control portion 7 reads the image on the front side of the document sheet using the second imaging portion 43. In the case where the conveyance route is set to the second conveyance route, the control portion 7 reads the image on the front side of the document sheet using the first imaging portion 42. It is noted that, in a case where the mode of reading the document sheets is set to a two-sided reading mode in advance, the image on the back side of the document sheet may be read using the third imaging portion 44.

<Step S38>

In step S38, the control portion 7 determines whether there are any document sheets on the document sheet placement portion 21 using the first detection portion 21A.

Upon determining that there is one or more document sheets on the document sheet placement portion 21 (Yes in step S38), the control portion 7 moves the process to step S32. In a case where there is no document sheet on the document sheet placement portion 21 (No in step S38), the control portion 7 moves the process to step S39.

<Step S39>

In step S39, the control portion 7 determines whether the current number of conveyed document sheets is greater than or equal to the number indicating the ordinal position of the last document sheet to be conveyed included in the conveyance route information stored in the first storage area of the storage portion 6.

Upon determining that the current number of conveyed document sheets is greater than or equal to the number indicating the ordinal position of the last document sheet to be conveyed included in the conveyance route information (Yes in step S39), the control portion 7 ends the first reading process. In a case where the current number of conveyed document sheets is not greater than or equal to the number indicating the ordinal position of the last document sheet to be conveyed included in the conveyance route information (No in step S39), the control portion 7 moves the process to step S40.

<Step S40>

In step S40, the control portion 7 executes a notification process of notifying that the number of conveyed document sheets in the first reading process is less than the number indicating the ordinal position of the last document sheet to be conveyed included in the conveyance route information.

Specifically, the control portion 7 causes the operation display portion 5 to display messages to the effect that the number of document sheets conveyed by the conveyance control portion 52 is less than the number indicating the ordinal position of the last document sheet to be conveyed included in the conveyance route information and that there is a possibility of a double feed. This allows the user to recognize that there is a possibility of a double feed and to respond by, for example, redoing the document sheet reading process.

[Second Reading Process]

Figure 7:
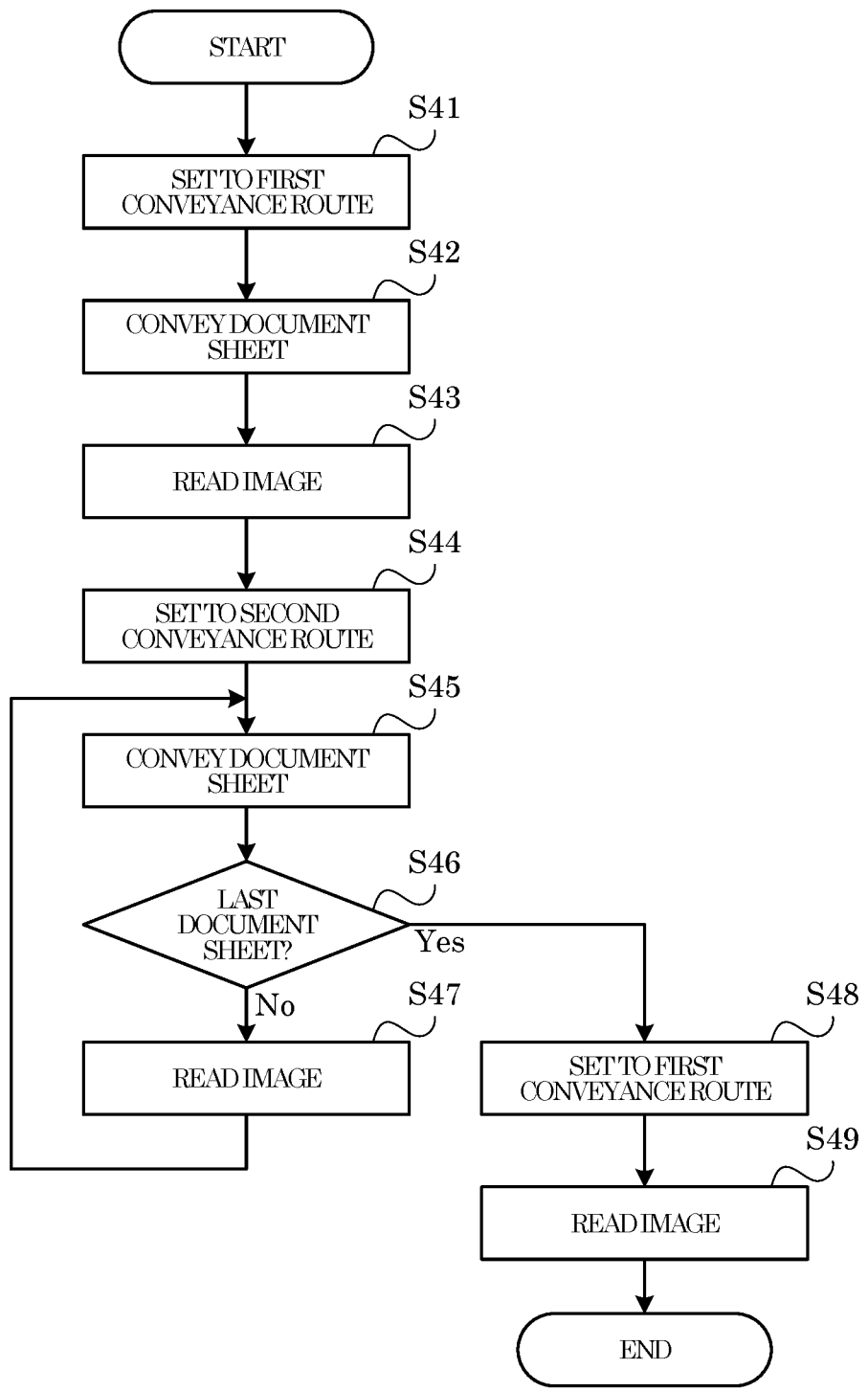
FIG. 7 is a flowchart showing an example of a second reading process executed by the image forming apparatus according to the embodiment of the present disclosure.

Next, the second reading process executed in step S19 of the document sheet reading process will be described with reference to FIG. 7.

<Step S41>

First, in step S41, the control portion 7 sets the conveyance route of the document sheets to the first conveyance route.

<Step S42>

In step S42, the control portion 7 conveys one of the document sheets placed on the document sheet placement portion 21 along the first conveyance route. This causes the first document sheet in the document sheet stack placed on the document sheet placement portion 21 to be conveyed.

<Step S43>

In step S43, the control portion 7 reads the image on the document sheet conveyed by the process in step S42.

<Step S44>

In step S44, the control portion 7 sets the conveyance route of the document sheets to the second conveyance route.

<Step S45>

In step S45, the control portion 7 conveys one of the document sheets placed on the document sheet placement portion 21 along the second conveyance route. This causes the second and subsequent document sheets in the document sheet stack placed on the document sheet placement portion 21 to be conveyed.

<Step S46>

In step S46, the control portion 7 determines whether the document sheet conveyed by the process in step S45 is the last document sheet in the document sheet stack placed on the document sheet placement portion 21.

Specifically, the control portion 7 determines that the document sheet conveyed by the process in step S45 is the last document sheet in the document sheet stack when the detection signal output from the first detection portion 21A is switched from the first signal to the second signal due to the conveyance of the document sheets from the document sheet placement portion 21.

Upon determining that the document sheet conveyed by the process in step S45 is the last document sheet in the document sheet stack placed on the document sheet placement portion 21 (Yes in step S46), the control portion 7 moves the process to step S48. In a case where the document sheet is not the last document sheet (No in step S46), the control portion 7 moves the process to step S47.

<Step S47>

In step S47, the control portion 7 reads the image on the document sheet conveyed by the process in step S45.

<Step S48>

In step S48, the control portion 7 sets the conveyance route of the document sheet to the first conveyance route.

It is noted that, in a case where the conveyance route cannot be switched before the document sheet that is being conveyed reaches the branching portion 22B, the control portion 7 may suspend the conveyance of the document sheet until the switching of the conveyance route is completed.

<Step S49>

In step S49, the control portion 7 reads the image on the document sheet conveyed along the first conveyance route.

In this manner, the image forming apparatus 100 receives the input operation to input the conveyance route information that indicates which of the first conveyance route and the second conveyance route each document sheet included in the document sheet stack placed on the document sheet placement portion 21 is conveyed along. Each document sheet included in the document sheet stack placed on the document sheet placement portion 21 is then sequentially conveyed along either the first conveyance route or the second conveyance route according to the conveyance route information input through the input operation. Thus, the conveyance route can be switched for each document sheet included in the document sheet stack to be conveyed on the basis of the information input by the user.

In addition, in the case where the specific operation is received, the image forming apparatus 100 conveys the first document sheet in the document sheet stack placed on the document sheet placement portion 21 along the first conveyance route, sequentially conveys the subsequent document sheets along the second conveyance route until it is determined that the last document sheet in the document sheet stack has been conveyed from the document sheet placement portion 21 on the basis of the result of detection by the first detection portion 21A, and then conveys the last document sheet along the first conveyance route. This saves the user from having to confirm the ordinal position of the last document sheet in the document sheet stack (the number of document sheets in the document sheet stack) during the input of the conveyance route information in the case where only the uppermost and lowermost document sheets are thick in the document sheet stack to be conveyed.

Another Embodiment

Figure 8:
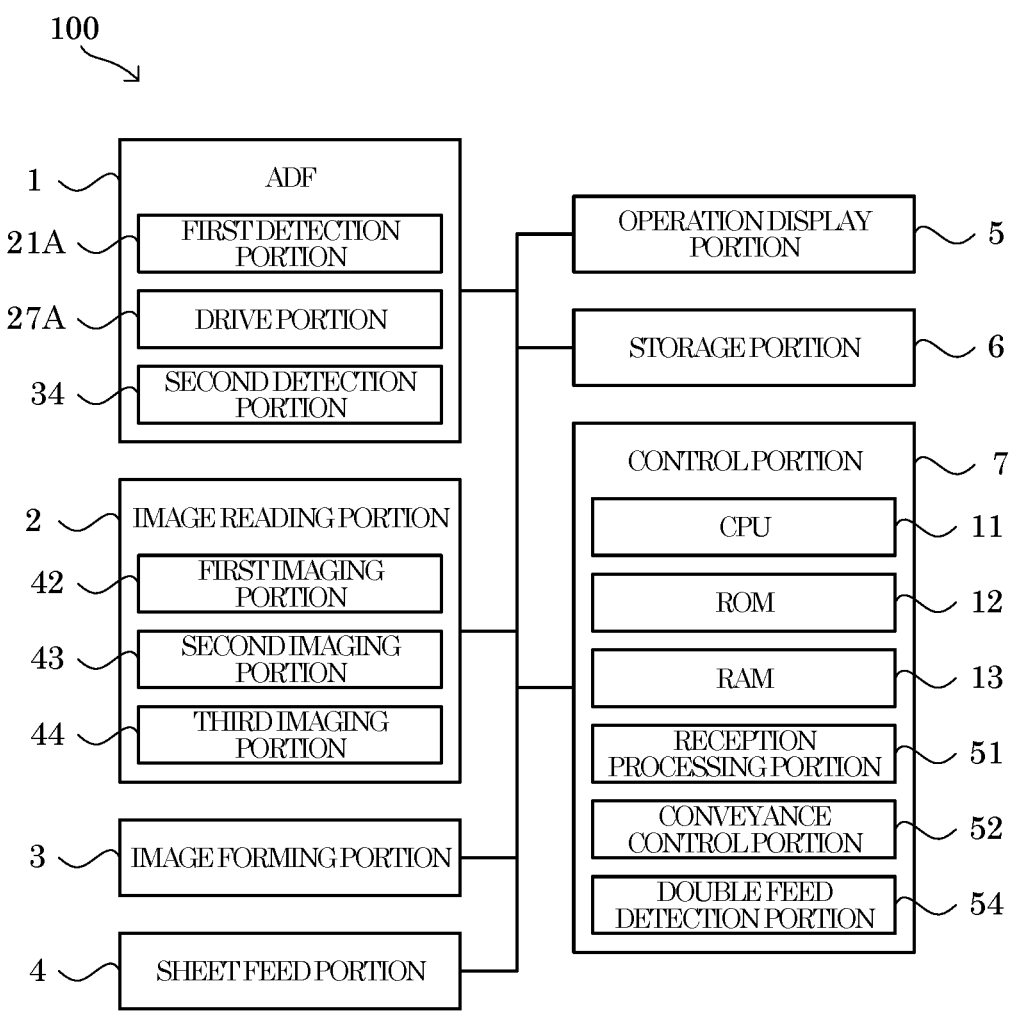
FIG. 8 is a block diagram showing a system configuration of an image forming apparatus according to another embodiment of the present disclosure.

The image forming apparatus 100 may include a second detection portion 34 shown in FIG. 8.

The second detection portion 34 is a sensor that determines the thicknesses of the document sheets passing through a detection position P1 (see FIG. 2) on the first conveyance path 22A located closer to the document sheet placement portion 21 than the branching portion 22B. For example, the second detection portion 34 is a transmission optical sensor or an ultrasound sensor disposed at the detection position P1.

In addition, the image forming apparatus 100 may include a double feed detection portion 54 shown in FIG. 8 instead of the notification processing portion 53.

The double feed detection portion 54 detects a double feed in a case where the thickness of a document sheet determined by the second detection portion 34 exceeds a threshold corresponding to the conveyance route of the document sheet.

The threshold includes a first threshold corresponding to the first conveyance route and a second threshold corresponding to the second conveyance route. The first threshold is set on the basis of the thickness of the document sheets of "thick paper". For example, the first threshold is obtained by multiplying the thickness of the document sheets of "thick paper" by a predetermined factor such as 1.2. The second threshold is set on the basis of the thickness of the document sheets of "normal paper". For example, the second threshold is obtained by multiplying the thickness of the document sheets of "normal paper" by the above-described factor.

For example, upon detecting a double feed of document sheets, the double feed detection portion 54 causes the conveyance control portion 52 to stop conveying the document sheets and notifies that a double feed of document sheets has been detected. For example, the double feed detection portion 54 causes the operation display portion 5 to display a message to the effect that a double feed of document sheets has occurred.

This configuration allows the conveyance route to be switched for each document sheet included in the document sheet stack to be conveyed and also allows detection of double feeds of the document sheets compared with a configuration in which the conveyance route of the document sheets is switched on the basis of the result of determination by the second detection portion 34.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying device comprising:
a processor configured to function as:
a reception processing portion configured to receive an input operation to input conveyance route information that indicates which of a first conveyance route and a second conveyance route each of sheets included in a sheet stack placed on a sheet placement portion is conveyed along for each of the sheets, the first conveyance route leading to a first discharge portion via a first conveyance path that extends straight from the sheet placement portion, the second conveyance route leading to a second discharge portion, which is different from the first discharge portion, via a second conveyance path that includes a curved portion branching off from the first conveyance path; and
a conveyance control portion configured to sequentially convey each of the sheets included in the sheet stack placed on the sheet placement portion along either the first conveyance route or the second conveyance route according to the conveyance route information input through the input operation; and
a first sensor configured to detect presence or absence of the sheets on the sheet placement portion, wherein
the conveyance route information indicates ordinal positions of the sheets to be conveyed along the first conveyance route,
the reception processing portion is configured to receive the input operation and a specific operation set in advance, and
in a case where the specific operation is received, the conveyance control portion is configured to convey a first sheet of the sheets in the sheet stack placed on the sheet placement portion along the first conveyance route, to sequentially convey the sheets along the second conveyance route until it is determined that a last sheet of the sheets in the sheet stack has been conveyed from the sheet placement portion based on a result of detection by the first sensor, and to convey the last sheet along the first conveyance route.

2. The sheet conveying device according to claim 1, wherein
the processor is further configured to function as a notification processing portion configured to provide notification in a case where the sheets conveyed by the conveyance control portion by a time it is determined that the last sheet of the sheets in the sheet stack placed on the sheet placement portion has been conveyed from the sheet placement portion based on the result of detection by the first sensor are fewer in number than numbers indicating the ordinal positions of the sheets to be conveyed included in the conveyance route information.

3. The sheet conveying device according to claim 1, further comprising:
a second sensor configured to determine thicknesses of the sheets passing through a detection position on the first conveyance path located closer to the sheet placement portion than a branching portion at which the second conveyance path branches off from the first conveyance path, wherein
the processor is further configured to function as a double feed detection portion configured to detect a double feed of the sheets in a case where the thicknesses of the sheets determined by the second sensor exceed a threshold corresponding to the conveyance route of the sheets.

4. An image processing apparatus comprising:
the sheet conveying device according to claim 1; and
a scanner configured to read images on the sheets conveyed by the sheet conveying device.

5. A sheet conveying method performed by a sheet conveying device, the sheet conveying method comprising:
receiving an input operation to input conveyance route information that indicates which of a first conveyance route and a second conveyance route each of sheets included in a sheet stack placed on a sheet placement portion is conveyed along for each of the sheets, the first conveyance route leading to a first discharge portion via a first conveyance path that extends straight from the sheet placement portion, the second conveyance route leading to a second discharge portion, which is different from the first discharge portion, via a second conveyance path that includes a curved portion branching off from the first conveyance path; and
sequentially conveying each of the sheets included in the sheet stack placed on the sheet placement portion along either the first conveyance route or the second conveyance route according to the conveyance route information input through the input operation, wherein
the sheet conveying device comprises a first sensor configured to detect presence or absence of the sheets on the sheet placement portion,
the conveyance route information indicates ordinal positions of the sheets to be conveyed along the first conveyance route,
in the receiving an input operation, the input operation and a specific operation set in advance is received, and
in the sequentially conveying each of the sheets, in a case where the specific operation is received, a first sheet of the sheets in the sheet stack placed on the sheet placement portion is conveyed along the first conveyance route, the sheets are sequentially conveyed along the second conveyance route until it is determined that a last sheet of the sheets in the sheet stack has been conveyed from the sheet placement portion based on a result of detection by the first sensor, and the last sheet is conveyed along the first conveyance route.

6. A sheet conveying device comprising:
a processor configured to function as
- a reception processing portion configured to receive an input operation to input conveyance route information that indicates which of a first conveyance route and a second conveyance route each of sheets included in a sheet stack placed on a sheet placement portion is conveyed along for each of the sheets, the first conveyance route leading to a first discharge portion via a first conveyance path that extends straight from the sheet placement portion, the second conveyance route leading to a second discharge portion, which is different from the first discharge portion, via a second conveyance path that includes a curved portion branching off from the first conveyance path; and
- a conveyance control portion configured to sequentially convey each of the sheets included in the sheet stack placed on the sheet placement portion along either the first conveyance route or the second conveyance route according to the conveyance route information input through the input operation; and
- a first sensor configured to detect presence or absence of the sheets on the sheet placement portion, wherein
the conveyance route information indicates ordinal positions of the sheets to be conveyed along the first conveyance route or the second conveyance route, and
the processor is further configured to function as a notification processing portion configured to provide notification in a case where the sheets conveyed by the conveyance control portion by a time it is determined that a last sheet of the sheets in the sheet stack placed on the sheet placement portion has been conveyed from the sheet placement portion based on a result of detection by the first sensor are fewer in number than numbers indicating the ordinal positions of the sheets to be conveyed included in the conveyance route information.

7. The sheet conveying device according to claim 6, further comprising:
a second sensor configured to determine thicknesses of the sheets passing through a detection position on the first conveyance path located closer to the sheet placement portion than a branching portion at which the second conveyance path branches off from the first conveyance path, wherein the processor is further configured to function as a double feed detection portion configured to detect a double feed of the sheets in a case where the thicknesses of the sheets determined by the second sensor exceed a threshold corresponding to the conveyance route of the sheets.

8. An image processing apparatus comprising:
the sheet conveying device according to claim 7; and
a scanner configured to read images on the sheets conveyed by the sheet conveying device.

9. A sheet conveying method performed by a sheet conveying device, the sheet conveying method comprising:
receiving an input operation to input conveyance route information that indicates which of a first conveyance route and a second conveyance route each of sheets included in a sheet stack placed on a sheet placement portion is conveyed along for each of the sheets, the first conveyance route leading to a first discharge portion via a first conveyance path that extends straight from the sheet placement portion, the second conveyance route leading to a second discharge portion, which is different from the first discharge portion, via a second conveyance path that includes a curved portion branching off from the first conveyance path; and
sequentially conveying each of the sheets included in the sheet stack placed on the sheet placement portion along either the first conveyance route or the second conveyance route according to the conveyance route information input through the input operation, wherein
the conveyance route information indicates ordinal positions of the sheets to be conveyed along the first conveyance route or the second conveyance route,
the sheet conveying device comprises a first sensor configured to detect presence or absence of the sheets on the sheet placement portion, and
the sheet conveying method includes providing notification in a case where the sheets conveyed by the sequentially conveying each of the sheets by a time it is determined that a last sheet of the sheets in the sheet stack placed on the sheet placement portion has been conveyed from the sheet placement portion based on a result of detection by the first sensor are fewer in number than numbers indicating the ordinal positions of the sheets to be conveyed included in the conveyance route information.

\* \* \* \* \*